United States Patent [19]
Griffin

[11] 4,177,911
[45] Dec. 11, 1979

[54] PANEL CARRIER

[76] Inventor: Edward O. Griffin, 54 Fort St., Presque Isle, Me. 04769

[21] Appl. No.: 892,021

[22] Filed: Mar. 31, 1978

[51] Int. Cl.² .............................................. B65G 7/12
[52] U.S. Cl. ............................... 224/45 P; 224/45 M; 294/15
[58] Field of Search ............... 224/45 R, 45 F, 45 M, 224/45 N, 45 P, 45 Q, 45 T, 48 R; 294/15

[56] References Cited
U.S. PATENT DOCUMENTS

| | | |
|---|---|---|
| 2,262,918 | 11/1941 | Brown . |
| 2,399,786 | 5/1946 | Cayton .................................. 224/45 F |
| 2,428,941 | 10/1947 | Packard . |
| 2,430,142 | 11/1947 | Roberts ................................. 224/45 P |
| 2,651,441 | 9/1953 | Rau et al. ............................. 224/45 Q |
| 3,203,606 | 8/1965 | Masterson, Jr. ..................... 224/45 Q |
| 3,524,670 | 8/1970 | Ilich . |
| 3,761,107 | 9/1973 | Docherty et al. ................... 294/15 X |
| 4,013,202 | 3/1977 | Russo . |
| 4,098,442 | 7/1978 | Moore .................................. 224/5 P |
| 4,113,160 | 9/1978 | Spiers ................................... 294/15 X |

*Primary Examiner*—Trygve M. Blix
*Assistant Examiner*—Winston H. Douglas

[57] ABSTRACT

A carrier for use by one person to carry large flat panels and having a plurality of longitudinally spaced apart feet for supporting the bottom edge of one or more panels, a plurality of upwardly extending legs connected at their lower ends to the feet, and a generally horizontally and longitudinally extending handle connected to the tops of the legs.

1 Claim, 3 Drawing Figures

PANEL CARRIER

FIELD OF THE INVENTION

This invention relates to apparatus for carrying bulky panels.

BACKGROUND OF THE INVENTION

In carrying large panels of building materials (e.g., 4' by 8' sheetrock or plywood), two persons are usually required, one at each end of the panel. The large size of the panels makes it very difficult for one person to grasp them unassisted in any manner effective for carrying. Attempts to move the panels single handedly by dragging one edge often lead to panel damage. The following patents show one man carrying devices that either require two hands for operation, one to support the load and the other to prevent the panels from tipping, or do not provide subjacent support for the panels.

Masterson U.S. Pat. No. 3,203,606 shows a one man panel carrier having a single foot and leg and requiring use of a second hand to prevent the panel from tipping.

Packard U.S. Pat. No. 2,428,941 shows a one man panel carrier with a trough-shaped foot to which two legs are rotatably connected. The carrying handle is positioned between the two legs and is spaced from the panel by a U-shaped yoke. Two hand operation is required by the provision for rotation between the foot and the legs.

Russo U.S. Pat. No. 4,013,202 and Ilich U.S. Pat. No. 3,524,670 show one man panel carriers that rely on an arrangement of moving parts to grip the top edge of the panel by squeezing it between members positioned on either side.

Caton U.S. Pat. No. 2,399,786 shows a one man carrier for bulky items such as mattresses. Two hands support the load: one hand grasps a handle on the user's side of the load and the other a flexible strap resting on the user's shoulder.

Brown U.S. Pat. No. 2,262,918 shows a furniture lifting device having a single foot, leg, and handle; two of the devices are needed to carry elongated items.

SUMMARY OF THE INVENTION

I have discovered a simple, sturdy, compact, and most effective means by which large flat panels can be carried by one person using only one arm. My new panel carrier supports one or more panels in a vertical position and has a plurality of longitudinally spaced apart feet for supporting the bottom edge of each panel, a plurality of upwardly extending legs connected at their lower end to the feet, and a generally horizontal and longitudinally extending handle connected to the tops of the legs. The longitudinally spaced apart feet prevent each panel from tipping out of the carrier and the longitudinally extending handle allows longitudinal adjustment of the lifting location to align the user's hand with the center of gravity, all of which allows the panels to be steadily carried with one arm. The longitudinally extending handle further provides a convenient means for installing the carrier by pushing it into place from one lifted end of a panel. The feet provide subjacent support which is safer and more reliable than gripping support of the top edges.

In preferred embodiments, the handle is spaced outward from the panels to provide a space for the user's hand, thereby eliminating the discomfort and potential panel damage caused by the user's hand rubbing against a panel; two legs and attached feet are provided, the feet have upwardly extending lips spaced from the point of attachment of the legs to retain the panels; the legs have straight lower portions and curved outward upper portions to space the handle away from the panels, the handle extends longitudinally beyond the legs to further facilitate installation of the carrier under a panel, and the handle is spaced upward from the feet a distance which positions the handle at the vertical location of the center of gravity of the panel to better balance the load and leaves exposed above the handle a width of panel that can be comfortably tucked under the user's arm when the panel is lifted from the floor. In a preferred embodiment for carrying 4 foot by 8 foot panels, the feet are spaced apart between 8 and 32 inches, the lips on the feet are spaced between 0.5 and 2.0 inches from the region of attachment of the legs with the feet, the handle is spaced between 0.5 and 2.0 inches outward from the straight portions of the legs, the longitudinally extending handle is between 24 and 48 inches in length and exceeds in length the spacing between the feet, and the handle is spaced upward from the feet between 22 and 26 inches. In these preferred embodiments the new carrier can be simply and inexpensively produced by welding together three pieces of thin-wall electrical steel conduit and two steel feet.

PREFERRED EMBODIMENT

We turn now to the structure and operation of a preferred embodiment of the invention, after first briefly describing the drawings.

Figure 1:
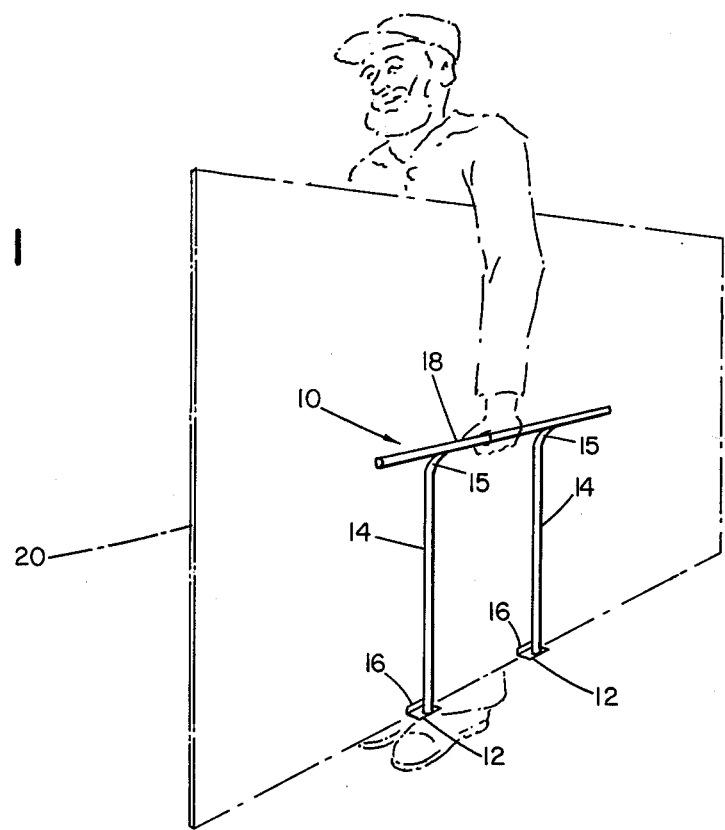
FIG. 1 is a perspective view of the carrier being used to carry a 4 foot by 8 foot panel.
Figure 2:
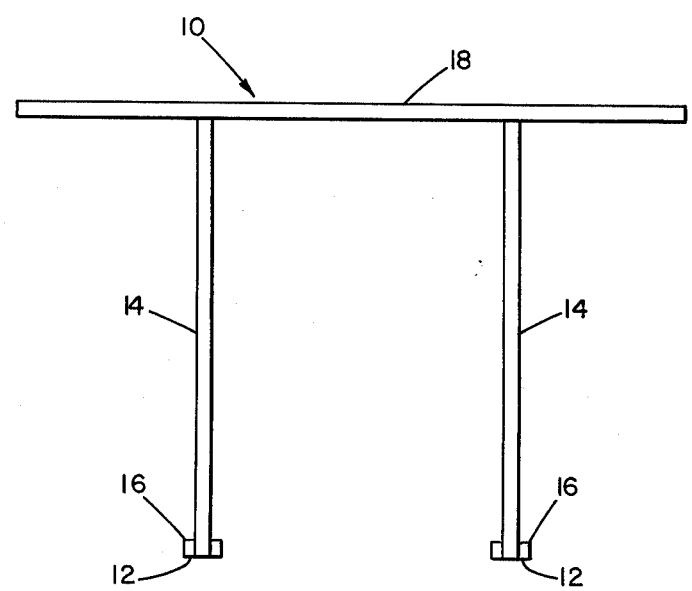
FIG. 2 is an elevation view of the carrier.
Figure 3:
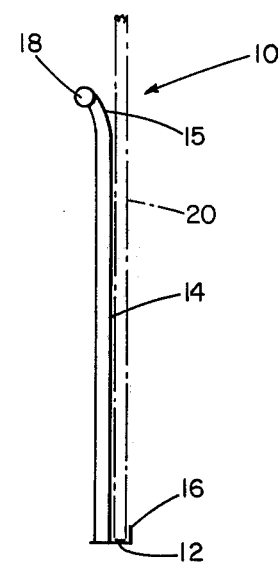
FIG. 3 is an end view of the carrier, showing the lower portion of a panel being held in the carrier.

Panel carrier 10 has two feet 12 (steel) welded to the bottoms of legs 14. The feet have lips 16 (¼ inch high) spaced 1 inch away from the legs. Legs 14 are curved outward at 15 near their upper ends and welded to horizontal handle 18. Handle 18 is positioned 24 inches above feet 12 and is 36 inches in length. Legs 14 are spaced apart 16 inches. The centerline of handle 18 is spaced outward 1 inch from the centerline of legs 14. The outward curve at 15 in legs 14 begins 2½ inches below the centerline of the handle. Feet 12 are 2 inches long (in the longitudinal direction parallel to handle 18). Handle 18 and legs 14 are ½ inch I.D. thin-wall steel electrical conduit.

In operation, the panel carrier is slid into place by lifting one end of 4' by 8' panel 20 (or multiple panels) and using long handle 18 to shove feet 12 under the bottom edge of the panel to a position near the panel's center of gravity. The user then moves along the side of the panel opposite the carrier and raises the panel by lifting the handle with one hand reaching over the top edge of the panel. Longitudinal adjustments in lifting location are easily made along the handle to achieve alignment with the panel's center of gravity. The user can then carry the panel with one hand. The curves 15 in the upper ends of legs 14 are directed outwardly away from the panel to provide a space between the handle and panel for the user to grip the handle without rubbing his hand against the panel. The 24 inch height of handle 18 above feet 12 leaves 24 inches of panel above the handle which can be comfortably tucked under the user's arm (FIG. 1), and positions the handle vertically at the center of gravity of the panel, thereby assisting in balancing the load. The panel is lifted approximately 8 inches off the floor, depending on the proportions of the user.

Other embodiments are within the scope of the following claims. For example, feet 12 could be integral extensions of legs 14 formed by flattening and bending the tubing of the legs.

What is claimed is:

1. A device facilitating the carrying by one man of a large flat building panel comprising a metal frame, said frame having a pair of spaced apart vertical legs, a panel supporting foot at the bottom of each leg and extending toward the user when the device is in use, each foot having an upwardly extending lip at its end, an elongated longitudinally extending handle interconnecting the legs at their upper ends and extending longitudinally beyond such upper ends, said legs and feet being adapted to support the panel between them and the user of the device with a width of the panel tucked under one of the user's arms, said legs near their upper ends being bent outwardly away from the load to offset the handle from the panel and provide space for the user's hand, and said legs extending upwardly to locate said handle in the vicinity of the vertical location of the center of gravity of the panel and being spaced longitudinally apart to stabilize the same against tipping, the portions of said handle which extend beyond the tops of the legs providing a convenient means for grasping the device and pushing it into place from one lifted end of the panel and the length of the handle permitting the user to shift his hand longitudinally along the handle to align the hand with the center of gravity of the panel so that the panel will be stable when carried.

* * * * *

UNITED STATES PATENT AND TRADEMARK OFFICE
CERTIFICATE OF CORRECTION

PATENT NO. : 4,177,911

DATED : December 11, 1979

INVENTOR(S) : Edward O. Griffin

It is certified that error appears in the above—identified patent and that said Letters Patent are hereby corrected as shown below:

Col. 4, line 9: Please change "load" to --panel--.

Col. 4, line 16: Please change "tops" to --upper ends--.

Signed and Sealed this

Tenth Day of June 1980

[SEAL]

Attest:

SIDNEY A. DIAMOND

Attesting Officer

Commissioner of Patents and Trademarks